April 4, 1961 R. N. GRAEBER ET AL 2,977,843
APPARATUS FOR AIMING LAMPS
Filed Oct. 27, 1958 2 Sheets-Sheet 1
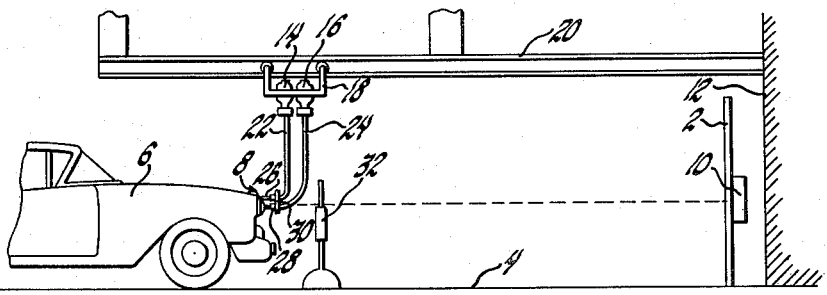
INVENTORS
Richard N. Graeber, &
BY Glenn E. Wanttaja
J. E. McGlynn Jr.
ATTORNEY INVENTORS
Richard N. Graeber &
Glenn E. Wanttaja
BY
ATTORNEY

United States Patent Office 2,977,843
Patented Apr. 4, 1961

2,977,843
APPARATUS FOR AIMING LAMPS

Richard N. Graeber, Mount Clemens, and Glenn E. Wanttaja, Rochester, Mich., assignors to General Motors Corporation, Detroit, Mich., a corporation of Delaware Filed Oct. 27, 1958, Ser. No. 769,692

5 Claims. (Cl. 88—14)

The present invention relates to an apparatus for optically aiming lamps and, more particularly, to such an apparatus adapted primarily for use in an automotive assembly plant in aiming headlamps installed on a vehicle.

In automotive vehicle assembly plants, it is the conventional practice, after final assembly of a particular vehicle, to transport the vehicle to an aiming station in which the headlamps thereof are to be properly aimed in conformity with the lighting regulations of the various local governments. In past years, much effort has been expended under the auspices of the Society of Automotive Engineers to regulate and standardize headlamp aiming procedures to insure conformity with the aforementioned regulations. As a result, the majority if not all of the major automotive assembly plants aim vehicle headlamps according to the Lighting Inspection Code and Recommended Practice for lamp aim inspection of the Society of Automotive Engineers.

As an example of these S.A.E. recommendations, reference may be made to the recommendations for the aim of the symmetrical beam pattern of a conventional seven inch diameter sealed lamp which is illuminated on upper beam. The S.A.E. recommended practice for aim inspection of the aforementioned lamp unit requires that the vehicle equipped with the lamps be positioned on a level floor with the headlamps twenty-five feet from an aiming screen on which there are provided coordinate reference axes for each headlamp of the vehicle. These coordinate axes include a vertical axis through each of the lamp centers, and a horizontal axis corresponding to the height of the lamp centers; that is, the intersection of each vertical axis with the horizontal axis corresponds to the horizontal projection on the aiming screen of each lamp center. With a particular vehicle disposed with respect to an aiming screen as aforedescribed, it is the S.A.E. recommendation that, first, approval shall be refused in the center of the upper beam high intensity zone of the seven inch headlamp is more than six inches to the right or left of straight ahead which corresponds to the aforementioned vertical reference axis for each lamp and, secondly, approval shall be refused if the center of the upper beam high intensity zone of the seven inch unit is aimed higher or lower than two inches below the lamp center level which corresponds to the horizontal reference axis aforedescribed. The tolerance for this inspection is plus or minus two inches.

With these or, as is often if not normally the case, more narrow tolerances in mind, it has been the conventional practice in automotive assembly plants to position a vehicle as aforedescribed, illuminate the lamps and thereafter adjust the respective headlamps until such time as the upper beam high intensity zone has been noted to fall within the tolerance area on the aiming screen. The adjustment of the headlamps has been accomplished manually by selectively adjusting the plural aiming screws conventionally used to adjustably mount the sealed lamp unit to the vehicle.

With respect to seven inch sealed lamp units, the lower beams thereof are not aimed. The reason for this is, as is well known to those acquainted with this art, that such lamps typically include upper and lower beam filaments located in particular predetermined relative positions within the lamp. The upper beam filament is placed substantially at the focal point of the reflector element of the lamp, while the lower beam filament is placed slightly off-focus. Thus, upon proper aim being achieved on upper beam, the lower beam filament is located accurately enough relative to the upper beam filament, reflector and lens of the lamp so that proper aim thereof naturally follows. With the upper beam properly aimed, the high intensity portion of the lower beam pattern should fall substantially within the lower right hand quadrant of the aforedescribed reference axes on the aiming screen.

The aforementioned seven inch sealed lamp units may be distinguished from the most recent development in vehicle lighting commonly referred to as dual headlamps which includes a pair of five and three-quarter inch diameter sealed lamp units on each side of the vehicle. As in the case of the seven inch headlamps aforedescribed, each of these dual headlamps is adjustably installed on the vehicle by aiming screws. Each pair of headlamps include what is now commonly referred to as a type I and a type II unit. In order to permit more accurate and independent aiming of the upper and lower beams as well as to provide better illumination in general, the filaments of these types of units are arranged in a manner different than the seven inch headlamp.

Therefore, in dual lamp systems, the type I unit includes only one filament, which is the main upper beam filament, located at the focal point of the lamp reflector. The type II unit, on the other hand, has two filaments as in the previously described seven inch unit. However, in the type II unit, the lower beam filament is placed at the focal point of the reflector, while an auxiliary upper beam filament is slightly displaced from the reflector focal point. The lens of the type I unit is designed particularly for distributing light from the upper beam filament, while the lens of the type II unit is designed for the lower beam filament. When the vehicle headlamp is on high beam, the type I and type II filaments are both illuminated. The upper beam high intensity zone is provided by the type I unit which has its filament on the reflector focal point, while the body light surrounding the high intensity area of the upper beam is provided by the off-focus filament of the type II unit. When the lamps are on low beam, only the type II unit is illuminated and, at that, only the lower beam filament thereof which is on the reflector focal point.

The known aiming procedure used with dual headlamps is substantially identical to that previously described with respect to the single lamp system. The high intensity zone of the upper beam provided by the type I unit of each pair of headlamps is first aimed and the unit adjusted until a pattern is provided on the aiming screen corresponding to the S.A.E. recommendations therefor. During this aiming operation of the type I unit, the type II unit of each pair of headlamps is covered with a black cloth or otherwise to prevent the body light from its off-focus beam filament from being projected onto the screen. Thereafter, the lamps are put on lower beam which corresponds to turning off the type I unit, all light being provided by the on-focus lower beam filament of the type II unit. The type II units are then adjusted in a manner similar to that previously described until such time as the high intensity zone of the lower beam pattern from the type II unit is disposed within the tolerance area substantially within the lower right hand quadrant of the aiming screen coordinate axes as aforedescribed.

From the above description of known procedures and methods for aiming both the single and dual lighting systems, it will be apparent that both involve placing the vehicle equipped with the lamps on a level floor with the headlamps a predetermined distance, preferably twent-five feet, from an aiming screen on which there are provided the aforementioned coordinate reference axes. Depending upon the type of lamp involved, a particular beam pattern is to be achieved in accordance with S.A.E. recommendations for aim inspection. After the particular lamp has been illuminated, the operator of the aiming station may selectively adjust the position of the particular lamp within its mounting installation until such time as he notes the beam pattern as falling in the predetermined position on the aiming screen, at which time the particular lamp is properly aimed.

As would be suspected, such aiming procedures are relatively inefficient and uneconomical particularly when it is remembered that these vehicles are assembled at a very rapid rate according to modern techniques of mass production. Moreover, where the aiming procedure is essentially a human operation in which the aiming station operator visually observes the pattern cast by the headlamp beam on the aiming screen coordinate axes, as is quite often the case, human error often enters the procedure resulting in inaccurately aimed headlamps.

In order to overcome these and other objections to known headlamp aiming methods and apparatus, it is a principal object and feature of this invention to provide an apparatus for optically aiming lamps, and particularly headlamps installed in a vehicle, which is more efficient and economical of time so as to be compatible with modern techniques of mass production, while substantially reducing if not totally eliminating sources of error in the lamp aiming procedure.

In order to facilitate the aiming procedure for headlamps installed in a vehicle at an assembly plant, it is yet a more specific object and feature of this invention to provide apparatus for automatically adjusting the position of the sealed lamp or light source on the vehicle until such time as the beam emitted therefrom is in predetermined known direction or position relative to the aiming screen.

It is yet another object and feature of this invention to provide power-driven means for engagement with the aiming screws associated with a headlamp installation as aforedescribed, and which means is operatively drivingly coupled to light-responsive means on an aiming screen which is indicative of the direction of the beam emitted from the light source and its pattern on the aiming screen so that the lamp will be automatically dirigibly adjusted within its support until such time as the beam is projected in a predetermined known direction and its pattern is in a predetermined known position with respect to the aiming screen.

In general, these and other objects of this invention are attained by providing a vertical aiming screen forming a reference plane fixedly positioned on a substantially level floor, and spaced a predetermined distance in front of the headlamps of a vehicle mounted at a suitable station. In this instance, this distance is preferably equal to twenty-five feet according to the S.A.E. recommendations for the aim of a vehicle headlamp, be it of the single or dual type. The vehicle station is provided with suitable mounting pads or other devices to insure that the center lines of successive vehicles may be placed in a datum position aligned with a datum axis on the aiming screen such as a vertical axis through the center thereof. For aiming a given headlamp beam pattern, plural spaced light-responsive pick-up units such as photocells are fixedly positioned on the aiming screen to measure the intensity of light impinging thereon. The spacing of these units is such as to define, within tolerances, a predetermined known position on the aiming screen on which the particular beam pattern should fall. Stating it another way, these units define limits within which the beam pattern of a properly aimed lamp should fall resulting necessarily in the beam direction being predetermined and known relative not only to the aiming screen, but relative to the center line of the vehicle as well. These pick-up units are arranged in groups, such as pairs, so as to compare the intensities of the light rays impinging thereon for measuring the direction of the beam and its pattern on the screen. If the light intensities measured by the units of each group do not bear some predetermined relationship, such as balanced, the headlamp is not properly aimed. Each group of pick-up units is connected to a detector to sense the presence or absence of a properly aimed lamp. If the lamp is improperly aimed, a detector or detectors will provide a voltage signal to motor mechanisms drivingly coupled to power-driven screwdrivers engaging the lamp aiming screws. These screwdrivers then adjust an aiming screw or screws to re-position the lamp in its support until such time as the groups of pick-up units sense the existence of the aforementioned relationship between or among light intensities. At this time, the lamp is properly aimed and the power screwdrivers cease to operate.

The aforementioned apparatus will become more fully apparent hereinafter as the description of the invention proceeds, and in which reference is made to the following drawings in which:

Figure 1 is a fragmentary side elevational view of a suitable aiming station, and particularly an aiming station in an automotive assembly plant, which illustrates the arrangement of the apparatus of this invention;

Figure 2 is an enlarged fragmentary front elevation of the aiming screen of Figure 1 showing particularly the left side thereof which is identical to the right side;

Figure 3 is a diagrammatic view, on reduced scale, corresponding to Figure 2, and illustrating the pattern cast on the left portion of the aiming screen by the upper beam high intensity zone of a properly aimed single or seven inch headlamp;

Figure 4:
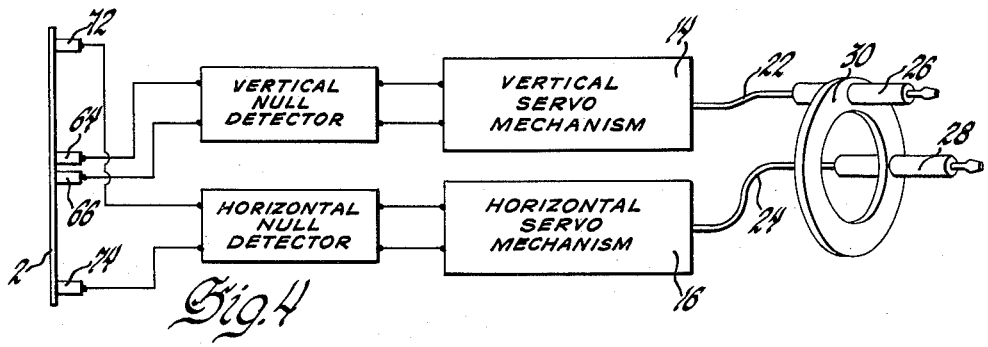
Figure 4 is a diagrammatic view illustrating one form of aiming apparatus which may be employed at the aiming station of Figure 1.

In the interest of clarity and in order to avoid confusion, the following description will be made with particular reference to the aforementioned seven inch sealed beam lamp units; that is, a single lamp on each side of the vehicle. However, in view of the above discussion and the description to follow, it will be apparent that the method and apparatus of this invention may be employed in aiming each lamp of a dual lamp system. In a further effort not to obscure the invention with unnecessary detail, and with particular reference to the illustration of Figure 4, conventional components of the apparatus and those devices which are commercially available or well known in the art are illustrated schematically.

Referring now to Figure 1, there is shown a fixed aiming screen 2 defining a reference plane vertically positioned on a substantially level floor 4 opposite a vehicle 6 disposed at a suitable station on the floor opposite the aiming screen so that the headlamps 8 installed therein are horizontally spaced a predetermined distance, preferably twenty-five feet in accordance with the S.A.E. aiming recommendations, in front of the aiming screen. An electronic light-sensitive assembly is indicated generally at 10 as being affixed to the rear wall of the aiming screen, the latter being spaced forwardly of the wall 12 or any other obstruction in the plant so as to provide a clearance space for ready access to the electronic equipment. This electronic equipment is electrically connected to a vertical servo-motor mechanism 14 and a horizontal servo-motor mechanism 16 suitably fixedly secured to a conveyor member 18 movably mounted on a track 20 suitably supported over and extending between the aiming screen 2 and vehicle 6. The vertical and horizontal motor mechanisms 14 and 16 are respectively drivingly connected by the rotatable flexible cables 22 and 24 to the power-driven screwdrivers 26 and 28 circumferentially spaced ninety degrees apart and fixed to an annular ring-like aiming head or fixture 30. This fixture may be manually positioned in front of the lamp to be aimed with the respective screwrivers in engagement with the usual aiming screws as to be described. In order to concentrate the rays of light emanating from a particular headlamp onto the aiming screen 2, a relatively large condensing lens 32 is positioned in front of the headlamp on the vehicle between the latter and the aiming screen 2.

At this juncture, and as to appear more fully hereinafter, suffice it to say that the motors 14 and 16 function to drive the respective power-driven screwdrivers 26 and 28 to adjustably position the sealed lamp unit within its mount on the vehicle to correctly position the direction of the light beam and therefore the pattern of the beam cast on the aiming screen 2 in accordance with signals provided by the electronic equipment 10.

Figure 5:
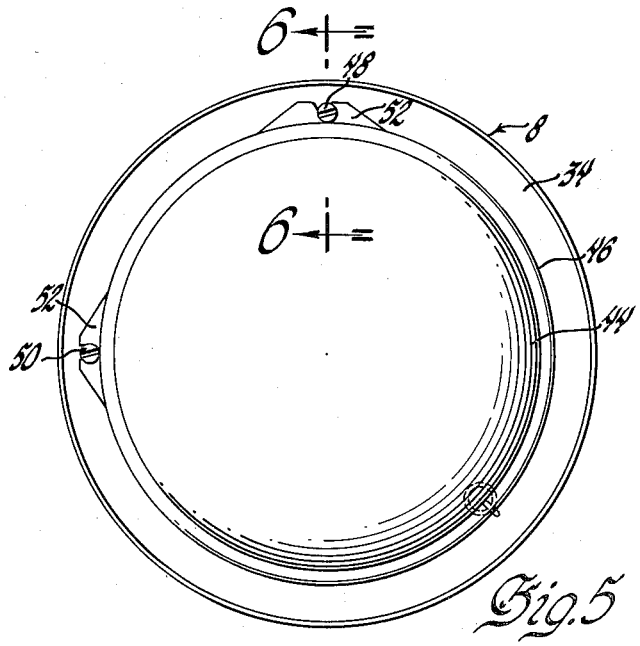
Figure 5 is an enlarged front elevation of a headlamp with which the vehicle of Figure 1 is equipped.
Figure 6:
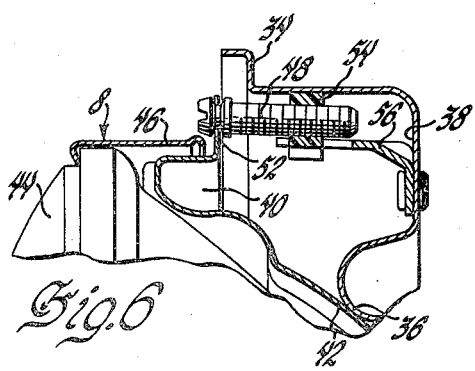
Figure 6 is a fragmentary sectional view taken on line 6—6 of Figure 5.

Figures 5 and 6 illustrate a common form of the headlamp assembly 8, often referred to as a "ball-and-socket" assembly. The assembly includes a structural member 34 secured to the vehicle, and including an annular rolled metal rim 36 forming a socket surrounded by an annular channel 38. The ball unit to be adjustably mounted on the rim 36 comprises a shell-like mounting ring 40 having a generally spherical bearing surface 42 in engagement with rim 36, and adapted to immovably receive and hold the sealed lamp unit 44 comprising the usual sealed lens and reflector forming an envelope enclosing the light filaments. An annular retaining ring 46 engages the sealed periphery of the lamp unit and is secured to the mounting ring in the usual manner to retain the lamp in position and complete the ball member subassembly. The aiming screws 48 and 50 engage slotted ears 52 circumferentially spaced ninety degrees apart on the radial flange of mounting ring 40, and are adjustably threadably received in nuts 54 suitably secured to brackets 56 riveted to member 34 within channel 38. As will be readily apparent to those acquainted with this art, aiming screw 48 may be adjusted to position the ball subassembly in a generally vertical plane, while screw 50 permits generally horizontal adjustment.

The station on the level floor 4 in which successive vehicles 6 are positioned is preferably provided with suitable mounting pads or other means, not shown, insuring that the vehicles are placed in a datum position with respect to aiming screen 2. To this end, the center lines of successive vehicles are aligned with a vertical datum axis 58 preferably at the mid-point of the aiming screen 2. For ready visual reference purposes, a set of identical coordinate reference axes may be positioned on either side of the center line axis 58. Figure 2 illustrates these coordinate reference axes with respect to the left side of the aiming screen 2 and the left side of the vehicle 6. Each of these sets of axes includes a vertical reference axis 60 and a horizontal reference axis 62. For a single lamp on the left side of the vehicle, the vertical reference axis 60 corresponds to an axis passing through the projection on the screen of the center of the vehicle lamp on the left side of the vehicle. Consequently, these axes are determined by the horizontal spacing between the respective lamp centers. Similarly, the horizontal reference axis 62 is an axis passing through the projection on the aiming screen of the respective lamp centers and, therefore, is determined by the heights of the respective lamp centers. Thus, for the single headlamp on the left side of the vehicle, the intersection point "L" of the vertical and horizontal reference axes corresponds to the projection on the aiming screen 2 of the left lamp center.

Referring now specially to the upper beam high intensity zone of a conventional seven inch sealed lamp unit by way of illustration, it will be remembered that this beam pattern on a screen twenty-five feet from the lamp should be symmetrical. That is, approval is to be refused if the upper beam high intensity zone is more than six inches to the right or left of the vertical reference axis 60, or aimed higher or lower than two inches below lamp center level or the horizontal reference axis 62 within the two inch tolerance aforementioned. By referring to Figure 3 in particular, it will be clear that in meeting the aforementioned specification, the upper beam high intensity zone of a completely properly aimed seven inch lamp will fall symmetrically about the vertical reference axis 60 and a horizontal axis displaced two inches below the horizontal reference axis 62.

In order to establish an area on each side of the aiming screen which, within tolerances, will define the beam pattern illustrated in Figure 3, the light-sensitive electronic aiming equipment 10 aforementioned is provided. That portion of this electronic aiming equipment associated with the left side of the aiming screen is shown in Figure 4, it being understood that a counterpart of this equipment is also associated with the right headlamp side of the aiming screen. Therefore, with reference to Figures 2 and 4, each of these assemblies may be seen to include a pair of vertically spaced light-sensitive devices such as photocells 64 and 66 (shown out of vertical alignment for the purpose of clarification) having their light responsive elements exposed to the headlight beam through suitable apertures 68 and 70 in the aiming screen. Moreover, these photocells are connected in a suitable circuit to a Vertical Null Detector as indicated in Figure 4 which, in turn, is electrically connected to the vertical servo-motor mechanism 14. Similarly, a pair of horizontally spaced photocells 72 and 74 have their light responsive elements exposed to the headlamp beam through suitable apertures 76 and 78 in the aiming screen. These photocells are, in turn, electrically connected to the Horizontal Null Detector illustrated in Figure 4, which is electrically connected to the horizontal servo-motor mechanism 16. As aforementioned, each of the motor mechanisms is suitably drivingly connected to the respective power-driven screwdrivers 26 and 28 which are adapted to engage, respectively, aiming screws 48 and 50 of lamp assembly 8 during the aiming operation. Moreover, it will be understood that the aforedescribed electronic equipment will normally include power amplifiers where required, and that suitable reduction gearing may be interposed in the drive connection between each motor mechanism and its associated screwdriver.

The electronic apparatus aforedescribed functions to locate the light beam emitted from lamp 8 installed in the vehicle by measuring the differential intensity of the light impinging on the vertical aiming cells 64 and 66 and horizontal aiming cells 72 and 74. More specifically, in the embodiment shown, the cells are arranged so as to define the desired beam direction and its pattern on the screen upon the intensities of light impinging on the respective groups of cells becoming balanced. If the light intensity on the vertical or horizontal group of cells, or both, are not balanced, the lamp is not properly aimed. As a result, the vertical or horizontal null detector, or both, develops a signal voltage to drive the screwdrivers. The lamp assembly is then adjusted until properly aimed, at which time the detector or detectors sense a balanced light condition interrupting further operation of the screwdrivers.

The operation of the apparatus of this invention will now be described with particular reference, by way of illustration, to the aiming of the upper beam high intensity zone of a seven inch single unit type sealed beam headlamp. A vehicle 6 having a headlamp assembly 8 on the left and right sides thereof is driven into the aiming station on the level floor 4 so that the center line of the vehicle is placed in a datum position with respect to the aiming screen 2 and normal to the latter; that is, the center line of the vehicle is aligned with the datum axis 58 on the aiming screen. At this point, in order to obtain the most accurate aim possible, it is preferable that the pressure in the vehicle tires be substantially equalized and maintained so that constant load be maintained in the car, and that the latter be rocked sidewise to equalize the springs. The fixture 30 is then placed in front of the lamp assembly 8 with screwdrivers 26 and 28 respectively engaging aiming screws 48 and 50. It will be noted that the ring-like configuration of fixture 30 permits light rays to pass therethrough when the lamp is illuminated. The upper beam filaments of the headlamps are then illuminated. The objective then is to adjust the respective vehicle headlamps so that the high intensity zone of the upper beam pattern thereof will be disposed on the aiming screen substantially as shown in Figure 3.

Referring now more specifically to Figures 2, 3 and 4 and the procedure for aiming the left headlamp, it may be assumed that the upper beam high intensity zone of light cast by the left headlamp projects a beam pattern on the aiming screen 2 other than that shown in Figure 3. In this regard, it will be remembered that the vertically spaced photocells 64 and 66 and horizontally spaced photocells 72 and 74 in effect establish tolerance areas on the aiming screen within which the upper beam high intensity zone should fall when the lamp is properly aimed. The fact that the beam pattern does not fall in the position shown in Figure 3 is sensed by one or the other or both pairs of the photocells aforementioned. For example, if the beam pattern is too high or too low, an unbalanced signal results in the Vertical Null Detector indicated in Figure 4. Similarly, if the beam pattern is too far to the left or right, an unbalanced signal results in the Horizontal Null Detector. At any time that such unbalanced signals are received by the respective null detectors, a signal voltage is sent to one or the other or both of the servo mechanisms which are then energized to drive the respective power-driven screwdrivers 26 and 28 through the flexible cables 22 and 24. Thus, it will be understood that the respective power-driven screwdrivers are rotated in the proper direction in accordance with the direction of unbalance signalled by the respective null detectors to, in effect, cause the actual pattern emitted from the light source to seek the position shown in Figure 3. Although only vertical or only horizontal adjustment of the lamp may be required, which adjustments may be made independently of each other through operation of the respective motor mechanisms, it will be clear that both vertical and horizontal adjustment will be achieved simultaneously if both are needed.

At the time of correct aim being achieved, resulting in the beam pattern of Figure 3, the output from the respective pairs of photocells are balanced resulting in a "null" signal in the respective detectors thereby interrupting and discontinuing further operation of the power-driven screwdrivers. At this time, the operator of the aiming station knows that the headlamps are aimed within the desired tolerance area defined by the positioning of the respective photocells or, in other words, that the direction of the beam emitted from the light source and its pattern are in predetermined known positions with respect to the aiming screen.

As aforementioned, it makes no difference whether the lamp assembly of Figures 5 and 6 is a seven inch lamp unit or one of the more modern dual lamps either of the type I or type II unit aforedescribed. The apparatus aforedescribed functions in the same manner to accomplish correct headlamp aim. As will be obvious, all that is necessary to correctly aim a type I or type II unit is to properly space the photocells on the aiming screen so as to establish a tolerance area thereon into which either the upper or lower beam high intensity zone, as the case may be, may fall.

Having described a preferred embodiment of the invention, this description should be understood to be by way of illustration only, and in no way is intended to limit the scope of the invention which is defined by the claims which follow.

We claim:

1. Apparatus for aiming a headlamp assembly installed in a vehicle and of the type comprising a fixed lamp support secured to the vehicle, a light source, and plural spaced adjustable aiming fasteners selectively movably mounting said light source on said support; said apparatus comprising a fixed reference plane, a fixed station opposite said plane in which said vehicle may be placed in a datum position relative to said plane, means for adjusting said light source relative to said support until the direction of the beam emitted from said source is in a predetermined known position relative to said plane, said means comprising light-responsive means on said reference plane indicative of light beam direction, and automatic fastener-adjusting means acting on said aiming fasteners to adjust said light source relative to said support in response to a signal from said light-responsive means.

2. Apparatus for aiming a lamp assembly of the type comprising a fixed support, a light source, and plural adjustable aiming screws movably mounting said light source on said support; said apparatus comprising a fixed aiming screen including light-responsive means indicative of the direction of the beam emitted from said source, a fixed station opposite said screen in which said support may be placed in a datum position relative to said aiming screen, plural power-driven screwdrivers respectively engageable with said aiming screws, and operating means for selectively driving said screwdrivers in response to a signal from said light-responsive means to adjust said light source to a position in which the direction of the beam emitted therefrom is in a predetermined known position relative to said aiming screen.

3. Apparatus for aiming a headlamp assembly installed in a vehicle and of the type comprising a fixed lamp support secured to the vehicle, a light source, and plural spaced adjustable aiming screws selectively movably mounting said light source on said support; said apparatus comprising a fixed reference plane including means indicative of the direction of the beam emitted from said source, a fixed station opposite said reference plane in which said vehicle and lamp support may be placed in a datum position relative to said reference plane, and plural automatic power-driven screwdrivers respectively engaging said aiming screws and operating in response to a signal from said direction indicating means to adjust said light source to project the beam emitted therefrom in a predetermined known direction relative to said reference plane.

4. Apparatus for aiming a lamp assembly of the type comprising a fixed support, a light source, and plural adjustable aiming screws movably mounting said light source on said support; said apparatus comprising a fixed aiming screen, a fixed station opposite said screen in which said support may be placed in a datum position relative to said screen, means for automatically adjusting said light source relative to said support until the beam pattern emitted from said source is in a predetermined known position on said aiming screen, said means comprising plural power-driven screwdrivers respectively engaging said aiming screws, plural spaced light-responsive means fixedly positioned on said aiming screen and defining said predetermined known position of the beam pattern, and means connecting said light-responsive means to said screwdrivers to control operation of the latter in accordance with beam pattern position.

5. Apparatus for aiming a headlamp assembly installed in a vehicle and of the type comprising a fixed lamp support secured to the vehicle, a light source, and plural spaced adjustable aiming screws selectively movably mounting said light source on said support; said apparatus comprising a fixed aiming screen, a fixed station opposite said screen in which said support may be placed in a datum position relative to said screen, means for automatically adjusting said light source relative to said support until the beam pattern emitted from said source is in a predetermined known position on said aiming screen, said means comprising plural power-driven screwdrivers respectively engaging said aiming screws, plural spaced light-responsive means fixedly positioned on said aiming screen and defining said predetermined known position of the beam pattern, and means connecting said light-responsive means to said screwdrivers to control operation of the latter in accordance with beam pattern position.

References Cited in the file of this patent

UNITED STATES PATENTS

| | | |
|---|---|---|
| 1,456,150 | Ricker | May 22, 1923 |
| 2,136,237 | Elmendorf | Nov. 8, 1938 |
| 2,308,095 | Meeder | Jan. 12, 1943 |
| 2,563,892 | Waller et al. | Aug. 14, 1951 |
| 2,880,557 | Todd et al. | Apr. 7, 1959 |